United States Patent [19]

Tamari

[11] 3,818,308
[45] June 18, 1974

[54] INVERTING BRIDGE CIRCUIT

[75] Inventor: Mordechai I. Tamari, Mineola, N.Y.

[73] Assignee: Electronic Measurements, Inc., Neptune, N.J.

[22] Filed: Oct. 20, 1972

[21] Appl. No.: 299,358

[52] U.S. Cl............... 321/13, 321/2, 321/18, 321/25, 321/45 R
[51] Int. Cl. .................................... H02m 3/32
[58] Field of Search ......... 321/11, 12, 13, 18, 45 R; 317/33 R, 33 VR

[56] References Cited
UNITED STATES PATENTS

| | | | |
|---|---|---|---|
| 3,175,167 | 3/1965 | Lloyd............... | 321/45 R |
| 3,388,311 | 6/1968 | Lastra............... | 321/45 R |
| 3,418,556 | 12/1968 | Greenberg et al........ | 321/18 X |
| 3,629,725 | 12/1971 | Chun................ | 321/45 R |
| 3,691,450 | 9/1972 | Cox................. | 321/45 R |

*Primary Examiner*—A. D. Pellinen
*Attorney, Agent, or Firm*—Wood, Herron & Evans

[57] ABSTRACT

A power inverting bridge circuit for a highly regulated direct current power supply to provide high efficiency and increased current handling capacity. The inverting bridge circuit includes at least one pair of series-connected gate elements, preferably power transistors, connected across the leads of a DC power source and having a series-connection point between the gate elements defining one bridge output point. An alternating current path is provided between each power source lead and a second bridge output point. The primary coil of a transformer is connected across the two bridge output points. The gate elements are controlled by a high frequency square-wave generator to produce an alternating current in the primary coil of the transformer. A high frequency alternating current signal is produced in the transformer secondary coil which is easily rectified and filtered to produce the highly regulated output. An anti-crossconduction transformer ensures that each gate element ceases conducting before the other gate element is permitted to conduct. The anti-crossconduction transformer includes feedback from the transformer to the gate elements anti-crossconduction transformer ensure the gates are not overdriven by the square-wave generator. In addition, anti-crossconduction transformers are included to prevent the switching gate elements from conducting at the same time. For regulating the power supply output, a DC source boosting circuit is provided to raise the DC voltage to the inverting bridge circuit as the output voltage varies due to load or AC power source fluctuations.

14 Claims, 4 Drawing Figures

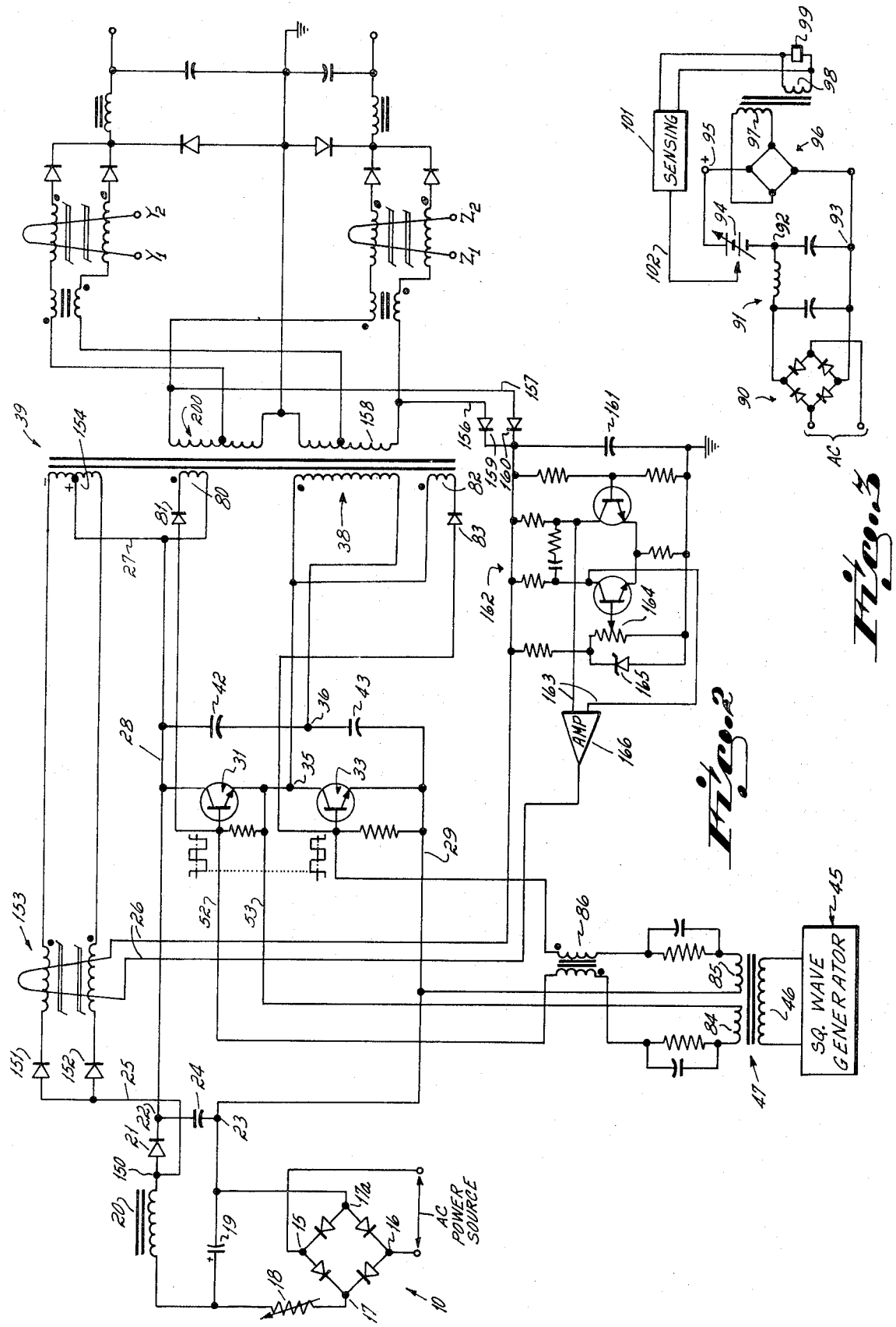

INVERTING BRIDGE CIRCUIT

This invention relates to easily regulated direct current power supplies and particularly to regulated power supplies which use inverting bridge circuits to generate high frequency alternating current signals which are rectified, regulated and filtered to produce a regulated direct current output.

In the field of regulated power supplies, many approaches have been utilized to produce a regulated direct current output from an alternating current source such as the standard 110 or 220 volt 60Hz power supplied by the electrical utilities. One approach has been to convert the alternating current supplied by the power company into an unregulated direct current. This direct current is then converted to an alternating current signal, usually at a frequency above 1kHz. The high frequency alternating current signal is then transformed to a different voltage by a transformer. The transformed voltage is then rectified and filtered to produce a direct current signal with negligible alternating current ripple. In addition, some form of voltage regulation is also provided to insure that the output voltage will remain constant as the load varies. Power supplies of this general type may include several transistors connected in a bridge configuration. The bridge itself is gated by a square-wave generator and has an output connected to the primary coil of a power transformer. By alternately gating the transistors in the bridge circuit, an alternating current signal is produced in the primary of the transformer. These bridge circuits typically comprise two pairs of transistors of the same conductivity type connected in series across the direct current power source. The series-connection point which connects the emitter of one transistor with the collector of the other transistor forms a bridge output point which is connected to the primary of a power transformer. A square-wave signal from a square-wave generator controls which transistor is conducting at any one time and controls the transistors to produce an alternating current signal in the transformer primary.

Inverting circuits of the design described above are highly susceptible to catastrophic failures which frequently destroy the transistors. The catastrophic failures, when observed by design engineers, appear to have characteristics associated with a thermal runaway condition. That is, due to heating of the elements, the operation of the inverter is so modified that the transistor junctions will become heated beyond their rated capacity and cause destruction of the transistor. To compensate for these observed thermal run-away conditions, the bridge circuits of the type described have been made by selecting transistors with power ratings significantly higher than those necessary for the rated power output of the supply. In addition, matched transistors are used to further insure that the bridge circuit itself is balanced to prevent their conductive states from overlapping. As a further precaution, additional heat sinks and forced-air cooling are used in an attempt to prevent catastrophic failure.

These prior art solutions to the catastrophic failure problem are by no means satisfactory. By selecting transistors with higher power ratings than necessary, the cost of the inverter is greatly increased. Also, a premium price is commanded by matched transistors, which introduces an additional cost element so significant that few purchasers find power supplies of this type economical. Additional cooling is frequently required which adds to the cost of the power supply. Besides the added cost, the solutions mentioned above frequently require a great deal of physical space, this space being for the cooling units and heat sinks and unrelated to the power supply operation itself. As a consequence of the foregoing problems and solutions, power supplies of the type described are not especially economical and have not enjoyed a wide customer acceptance.

Power inverting circuits of the type described are primarily operated at frequencies of approximately 5 kHz. As a result, the power transformers are usually large in size and have relatively high core and coupling losses associated therewith. Additionally, because the inverter is operating at a relatively low frequency, to achieve a pure direct current output, the rectified inverter output must be filtered with inductors and capacitors which are physically larger than is necessary to filter a higher frequency signal. Although the advantages of increasing the frequency are quite evident, the power inverters of the type described have been limited to relatively low frequency applications because, as inverting frequencies are increased, the circuits experience increased catastrophic failures from thermal runaway conditions.

Through a careful analysis of the power inverting bridge circuits previously used, it has been possible to determine the causes for the observed thermal run-away conditions which result in these catastrophic failures. One source of such failure has been recognized previously, although not completely satisfactorily solved. This problem stems from the mismatching of transistors in a bridge circuit, but even matching of the transistors has not been completely successful in eliminating the problems of imbalance in the bridge. This failure to solve the problem has been explained by the fact that the square-wave generator which gates the transistors in the bridge circuit normally does not produce a perfect square-wave driving signal, i.e., the square-wave is not symmetrical. As a result, certain transistors in the bridge are gated for times which differ from the gate time for other transistors. Under these operating conditions, an imbalance in the bridge circuit occurs which results in a direct current component or offset in the inverter signal waveform which is quite sizeable and which must be dissipated as heat by the series resistance of the transistors and the primary coil of the power transformer. Even a perfect square-wave drive to the transistors, will result, in actual practice, in a non-symmetrical inverter signal waveform because of differences in switching times of the transistors. The resulting direct current component causes excessive heat dissipation as described above. For typical conditions, the DC voltage imbalance may be as little as 1 volt and, assuming the resistance of the primary coil for the power transformer is 1 ohm, 1 ampere of current will flow in the primary coil. This direct current flowing in the primary may, under certain circumstances, saturate the transformer core and drastically impair the operation of the power inverting circuit. This current is also an additional source of heat in the transformer and the transistors.

A second source of heat in the bridge transistors arises from turning on and turning off of the series-connected transistors in the bridge itself. Theoretically, a square-wave signal, having opposite phases applied to the two series-connected transistors, will turn off one transistor as the other transistor is turned on. In practice, however, the conducting transistor usually takes more time to turn off than is required to turn on a nonconducting transistor. Because of this phenomenon, as one transistor is being turned off and the other turned on, both transistors are conducting simultaneously for a period of time causing an undetermined, but large, current to flow simultaneously through the conducting transistors.

As a consequence of these currents, the frequency of operation for the power inverting bridge must be maintained at a relatively low level in order to reduce the average power loss due to simultaneous conduction. If the frequency is too high, the periods of simultaneous conduction become a greater portion of the operating cycle and, therefore, greatly increase the heating within the transistors themselves.

As pointed out above, the simultaneous conduction of series-connected transistors is due to switching delays associated with the turning off of a conducting transistor. Usually, a conducting transistor is overdriven to ensure sufficient base drive when the load requires maximum current. Under these operating conditions, the transistors are operating in a saturation mode from which the time required to turn off the transistor is increased by a phenomenon referred to as the transistor storage time. For power inverting applications, transistors which are best suited to handle the power requirements normally have large storage times. Consequently, the storage time is a primary contributer to the switching losses encountered when the gates in the inverting bridge are switched.

As a result of the foregoing analysis and problems experienced in prior art power inverting bridge circuits, it is a primary object of this invention to provide a power inverting bridge which can be driven by nearly symmetrical square-wave sources at frequencies significantly higher than previously possible without requiring transistor matching or sophisticated circuitry to eliminate transistor heating by substantially eliminating simultaneous conduction during turn-on and turn-off of the series-connected bridge transistors and by eliminating direct currents in the power transformer.

It is a further object of the invention to provide a bridge inverter having gate elements driven by a square-wave source, said inverter including means to prevent the gates from operating in a saturation mode and ensuring that only the amount of drive required by each gate is applied to the gate elements at all times.

It is still another object of the invention to provide a power inverting bridge circuit with series-connected gate elements driven by a square-wave source including circuit means for substantially preventing simultaneous conduction of the gates during switching.

It is still a further object of this invention to provide a voltage boosting circuit to raise the input voltage of the bridge circuit when the output voltage falls below a reference voltage.

In order to achieve the above and other objects of the present invention in one embodiment thereof, four transistors are connected in a bridge configuration. The bridge itself comprises two pairs of series-connected transistors, each pair of series-connected transistors being connected across the power supply leads of a filtered but not regulated direct current supply. The series-connection point between the transistors in each pair of series-connected transistors forms one bridge output point. A DC blocking capacitor and a transformer primary coil are connected in series between the two bridge output points. A square-wave generator is coupled through appropriate transformer coils to produce driving signals for the transistors, producing an alternating current signal in the primary transformer coil at the same frequency as that of the square-wave generator. To eliminate switching losses associated with transistor storage time, a feedback is provided to couple a signal from the transformer into the base of each conducting transistor to prevent these transistors from saturating. In addition, anti-crossconduction transformers are provided to insure that one transistor in each pair of series-connected transistors is turned off before the other transistor in the pair of series-connected transistors is permitted to turn on. The inverter additionally includes a controlled DC source boosting circuit, for raising the input voltage to the power inverting bridge to a predetermined level as sensed and regulated by an output sensing circuit.

One advantage achieved by a circuit of the type described is best shown by example. A typical prior art power inverting bridge using four transistors can deliver 200 watts of power at a frequency of 5kHz. However, using a circuit including the improvements of this inverter, the same transistors can be used to deliver as much as 1,200 watts of power at a frequency of 20kHz. Obviously, the power handling capacity is vastly increased and the filtering is made easier.

The foregoing and other objects, features, and advantages of the present invention will become more clear from the following detailed description of preferred embodiments of the present invention as shown in the drawings which form a part of the original disclosure wherein:

FIG. 2 shows a power inverting circuit having only two transistors in the bridge; and FIG. 3 shows schematically a power boosting circuit for increasing the voltage to the power inverter as the load current increases, or the line voltage decreases.

Figure 1:
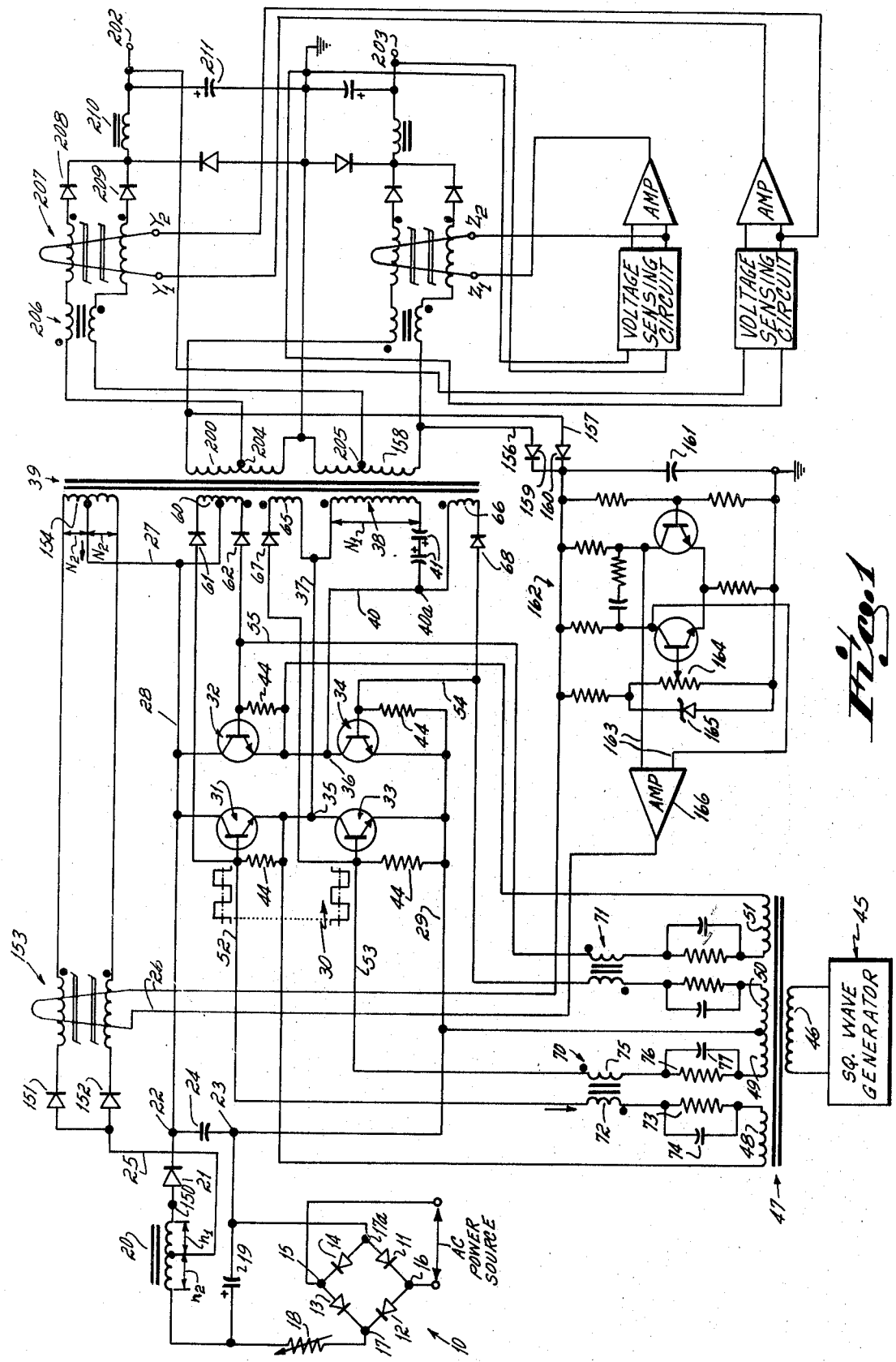
FIG. 1 is a schematic diagram for the power inverting circuit having a four-transistor bridge.

Referring now to FIG. 1, a diode bridge circuit 10 includes four diodes, 11, 12, 13 and 14 connected to form arms of a bridge circuit. The connection points 15 and 16 comprise the terminals to which an AC power source is connected. The AC power source is typically a conventional 110 volt 60 Hz signal supplied by an electric utility company. The bridge circuit 10 produces a positive voltage at point 17 with respect to the voltage at point 17a, the positive voltage being applied to a thermistor 18, which has a negative temperature coefficient of resistance and serves to limit surge current charging capacitor 19 when the power inverter is first turned on. The positive voltage from the thermistor 18 is applied to one lead of a capacitor 19 while the other lead of capacitor 19 is connected to point 17a. The capacitor 19 comprises a filtering network for the full-wave unfiltered signal from the bridge 10. The positive voltage appearing on the capacitor 19 is applied to a series-connected inductor 20 and diode 21 to produce at point 22 a positive voltage with respect to point 23. Connected between points 22 and 23 is capacitor 24 which forms part of the alternating current filtering network and also serves to store electricity for use by the power inverting circuit.

Connection wire 25, control wires 26 and a second connection wire 27 comprise some of the wiring associated with the power boosting circuit of the present invention. For the time being, FIG. 1 will be considered as if the power boosting circuit had been removed and wires 25, 26 and 27 were disconnected.

The positive terminal of the DC power source 22 is connected to a wire 28 and the negative terminal 23 is connected to a wire 29. Two pairs of series-connected transistors comprise the power inverting bridge 30. Each pair of series-connected transistors has a first transistor 31 or 32 connected at its respective collector electrode to the positive voltage on the wire 28. Each pair of transistors additionally includes a second transistor 33 or 34 with each respective emitter electrode connected to the negative supply wire 29. The first pair of series-connected transistors 31 and 33 have a series-connected point comprising an electrical connection between the emitter of transistor 31 and the collector of transistor 33. Similarly, the series-connected pair of transistors 32 and 34 have a series-connection which comprises the electrical connection between the emitter of transistor 32 and the collector of transistor 34. The first series connection comprises a bridge output point 35 which is connected by a wire 37 to the primary coil 38 of a power transformer 39. The series connection between transistors 32 and 34 comprises a second bridge output point 36 which is connected to one end of a wire 40. The other end of the wire 40 is connected at point 40a to two series-connected electrolytic capacitors 41. The other end of the series-connected capacitors 41 is connected to the primary coil 38. The polarity of the capacitors is arranged as shown because the DC bridge imbalance voltage is applied thereacross whose polarity is not predictable. While two series-connected capacitors 41 are shown in FIG. 1, they may be replaced by a single non-electrolytic capacitance provided the AC impedance of the capacitors is small at the operating frequency of the bridge circuit. The series-connected electrolytic capacitors 41 provide DC isolation between points 35 and 36 of the bridge circuit 30 without which the mismatching of the transistors 31, 32, 33 and 34 would produce a direct current voltage between points 35 and 36 during normal operation of the bridge 30. Without the capacitance 41, this direct current voltage would appear across and must be completely dissipated by the series resistance of the primary coil 38. As pointed out earlier, this direct current in the primary coil may cause transformer saturation as well as heat in the transformer and the transistors both conditions drastically degrading the system performance. With the capacitors 41 to provide a DC isolation between points 35 and 36, the DC power dissipation problem in the primary coil 38 is eliminated.

Referring briefly to FIG. 2, a modified bridge circuit is shown wherein the transistors 32 and 34 of FIG. 1 are replaced by series-connected capacitors 42 and 43 to provide alternating current paths from the direct current supply wires 28 and 29 to the output point 36. In this configuration, the DC isolation capacitors 41 in FIG. 1 are not necessary because the series-connected capacitors 42 and 43 provide the required DC isolation to prevent a DC current from flowing in the primary coil 38.

Referring again to FIG. 1, each of the transistors 31, 32, 33 and 34 in the bridge circuit 30 has a biasing resistor 44 connected between the base and emitter electrodes. The base driving network additionally includes a square-wave generator 45 which produces a square-wave output at a typical frequency of 20 kHz. The output of the square-wave generator 45 is applied to the primary coil 46 of a transformer 47 which has four secondary coils 48, 49, 50 and 51 which produce signals to drive the transistors in the bridge 30. A typical signal on the base-connecting wire 52 is shown and has a phase which is opposite to the signal shown for the base-connecting wire 53. As a consequence, the bridge driving network provides signals to the series-connected transistors 31 and 33 to cause transistor 31 to conduct while simultaneously preventing transistor 33 from conducting because the base drive signals are out of phase.

The base drive signals from transformer 47 are connected so the bridge transistors will conduct current alternating through the primary coil 38. To do this, the signal produced by the secondary coil 50 as applied to the base-connecting wire 54 is in the same phase as the signal applied on the base-connecting wire 52 from the secondary coil 48. Consequently, whenever transistor 31 is conducting, transistor 34 is also conducting and a current flows through primary coil 38 in a first direction. Similarly, the base-connecting wire 55 has a signal from the secondary coil 51 which has the same phase as the signal on the base-connecting wire 53 from the secondary coil 49. These latter mentioned signals will cause transistors 32 and 33 to conduct simultaneously and produce a current through primary coil 38 in a second direction opposite to the first direction.

In operation, the bridge network 30 functions as follows. The square-wave generator 45 produces a square-wave signal which alternately causes one transistor in each pair of series-connected transistors to conduct. That is, for example, transistor 31 will be conducting at a time when transistor 33 is turned off, and vice versa. A similar relationship exists for transistors 34 and 32, respectively. As a result, when the signal is applied on line 52 which turns on transistor 31, a similar signal is applied on the base-connecting wire 54 to turn on transistor 34. At the same time, turn-off signals are applied to the base of transistors 32 and 33. When transistors 31 and 34 are conducting, a current will flow from the positive supply wire 28, through transistor 31 to point 35, from point 35 through the primary transformer coil 38, through the DC isolation capacitors 41, through the transistor 34 to the negative supply wire 29. When the square-wave applied to the bases of each bridge circuit transistor changes polarity, the base drive signals will permit transistors 32 and 33 to conduct while transistors 31 and 34 will be turned off. When transistors 32 and 33 are conducting, a current passes from the positive supply lead 28, through the transistor 32 to the point 36, from point 36 through the wire 40, through the capacitor 41, through the primary coil 38, and the transistor 33 to the negative power supply wire 29. In this mode of operation, the current passes through the primary coil 38 in a different direction than the first current passing through this coil. Consequently, an alternating current signal passes through a primary coil 38 which can be picked up by magnetic coupling by a secondary coil 158 coupled to the primary coil 38.

It should be noted that the NPN transistors shown in FIG. 1 can be replaced by PNP transistors provided appropriate changes are made in the DC power supply and biasing networks; such changes will be readily apparent to those of skill in the art.

Referring again to FIG. 1, and considering the two series-connected transistors 31 and 33, it is noted that these two transistors can form a short circuit across the DC power source from the positive wire 28 to the negative wire 29, if both transistors 31 and 33 conduct simultaneously. When a square-wave signal, like that on the base drive line 52 has a phase which is opposite to the phase of the driving signal on the base drive line 53, transistors 31 and 33 theoretically will never conduct at the same time, assuming that the transistors 31 and 33 can be turned on or off instantaneously and that the rise and fall times of the signals on the lines 52 and 53 are zero. As a practical matter, however, such ideal conditions are not obtainable and a conducting transistor is found normally to require more time to be turned-off than is required to turn-on a non-conducting transistor of the same type.

It is a characteristic of transistors that the "turn-off" time is greater than the "turn-on" time. One of the reasons for the increased "turn-off" time is the carrier storage time of the transistor itself. After a transistor has been conducting in a saturation mode, i.e., when an increase of base drive current does not produce an increased collector current, the transistor inherently has stored carriers which have to be removed before conduction ceases. For transistors which are suitable for power inverter circuits, the storage time is typically of the order of 3 microseconds. Assuming an ideal "turn-on" condition and excessive base drive, this storage time will mean that a conducting transistor, for example, transistor 31, will cease conducting 3 microseconds after a non-conducting transistor, for example transistor 33, begins to conduct. This simultaneous condition of transistors 31 and 33 for 3 micro-seconds means that a large and uncontrolled current will pass through the simultaneously conducting transistors. The exact current is difficult to determine, but it is definitely greater than the current passing through the transistor during the steady-state conduction portion of its operating cycle. Assume, for the time being, that the ollowing conditions are present in such a circuit: the voltage between points 28 and 39 equals 350 volts and the steady-state current through the bridge transistors equals one ampere. Assuming that the current passing through the simultaneously conducting transistors during the switching period is of the order of 5 amperes, then approximately 1,750 watts of power must be dissipated during the 3 micro-second period when the the series-connected transistors are both conducting. With the square-wave base drive signals applied at a 20 kHz rate, the simultaneous conduction time during each cycle will be 6 micro-seconds, or, 12 percent of each operating cycle, during which time the 1750 watts must be dissipated by the transistors. Averaging this power over the full cycle, the average dissipation in the two transistors is approximately 146 watts. Assuming that the distribution of these losses is equal between the two series connected transistors, each transistor must dissipate approximately 73 watts of power to accomodate the losses experienced during the simultaneous conducting periods of time when the power inverter is operated at 20 kHz. By switching to a lower frequency, however, these losses can be greatly reduced. For example, assuming an operating frequency of 2 kHz, each transistor will have to dissipate only 7.3 watts of power to accomodate the losses occurring during the period of simultaneous conduction. From this analysis, it is clear why prior art inverting bridge circuits have been operated at relatively lower frequencies.

By careful analysis, the source of simultaneous conduction has been isolated and, with proper design, can be largely eliminated. Under typical conditions, the transistors in prior art bridge circuits have been operated in a saturation mode giving rise to the storage time delays associated with turning off of a conducting transistor. To overcome the problems associated with simultaneous conduction of the bridge transistors, the effects of storage time can be eliminated by operating the transistors in their linear rather than saturation mode. This change in operation can be achieved by a feedback circuit which will apply a voltage between the collector and base of a conducting transistor which will prevent saturation of the transistor even if excessive base drive is present. In FIG. 1, a center-tapped secondary coil 60 is coupled to the primary coil 38. The center tap of the secondary coil 60 is connected to the positive power supply lead 28 providing an electrical connection to the collector of transistors 31 and 32. The cathode of diode 61 is connected to one end of the secondary coil 60 and the cathode of diode 62 is connected to the other end of the secondary coil 60. The anode of diode 61 then connects to the base of transistor 31 while the anode of diode 62 connects to the base of transistor 32. Assuming that transistor 31 is conducting, a current will flow in the primary coil 38 in a direction from point 35 to point 36. As a consequence, a voltage will be induced in the secondary coil 60 which will place the cathode of diode 61 at a voltage below the collector voltage of transistor 31. For typical operating conditions, the number of turns for the secondary coil 60 is adjusted so that the voltage difference between the base and the collector of a conducting transistor, such as 31, is approximately 3 volts. By maintaining the base of transistor 31 at 3 volts below the voltage at the collector, transistor 31 will operate in its linear mode and any additional base current drive to the conducting transistor 31 will be taken off by the feedback circuit. A conducting transistor will have only the exact amount of base drive at all times to maintain the output load voltage. By operating the transistors in their linear mode, storage time delays are largely eliminated so a conducting transistor can be turned off more quickly than the same transistor operated in saturation mode.

Two additional secondary coils 65 and 66 are also coupled to the transformer primary coil 38. One end of the secondary coil 65 is connected to the collector of transistor 33, while the other end of the secondary coil 65 is connected to the cathode of a diode 67. The anode of this diode 67 is connected to the base of transistor 33. The secondary coil 65 and diode 67 provide the feedback network for transistor 33 to prevent saturation when transistor 33 conducts. Similarly, the secondary coil 66 and diode 68 serve as a signal feedback means from the primary coil 38 to the base of transistor 34 to insure that the transistor 34, when conducting, will be operating in a linear rather than saturation mode. The diode and secondary coils additionally serve to remove any excess drive current available at the base of a conducting transistor in the bridge circuit. By doing so, the speed with which a conducting transistor can be turned off is greatly increased because there is no longer a storage time delay associated with the transistor turn-off.

While the feedback means insure that each conducting transistor operates in a linear mode, it does not completely eliminate the simultaneous conduction of the series-connected transistors in the bridge circuit. It may be observed that as transistor 31 is turning off, transistor 33 is turning on and that some simultaneous conduction occurs during this switching period. By appropriate circuit means it is possible to prevent transistor 33 from turning on until such time as transistor 31 has been sufficiently turned off, thereby substantially reducing the simultaneous conduction of these transistors. This can be accomplished by a passive element such as an anti-crossconduction transformer. There are two anti-crossconduction transformers 70 and 71 shown in FIG. 1, each anti-crossconduction transformer comprising a toroid core with two coils wound therearound. The base of transistor 31 is connected to one lead of an anti-crossconduction transformer coil 72. The other lead of coil 72 connects through a biasing network comprising a resistor 73 and a shunting capacitor 74 to the secondary coil 48 on transformer 47. The base of transistor 33 is connected to one lead of another anti-crossconduction transformer coil 75 whose other lead is connected to a biasing network comprising the resistor 76 and the shunting capacitor 77.

In operation, the anti-crossconduction transformers perform in the following manner. Assume that transistor 31 is conducting and being turned-off by a signal applied to the base on line 52 while transistor 33 is not conducting, but being turned-on by a signal on line 53. During the turn-off of transistor 31, a current will flow out of the base of this transistor through the coil 72 in the direction indicated by the arrow. This outflow of base current from transistor 31 will induce a voltage in the transformer coil 75 to bias the base of transistor 33 in a direction opposite to that required to turn on transistor 33. Consequently, the base turn-on signal from the secondary coil 49 is counteracted by the signal induced into the coil 75 by the base current from the transistor 31 to prevent transistor 33 from turning-on as long as base current is flowing through the transformer coil 72. As a result of the operation of this simple circuit, transistor 31 must be substantially turned-off before the signal at the base of transistor 33 is sufficient to turn-on transistor 33. Transformer 71 is operative to prevent simultaneous conduction of transistors 32 and 34. Consequently, the anti-crossconduction transformers 70 and 71 operate to assure that switching losses are minimized by substantially turning off a conducting transistor in each pair of series-connected transistors before the base drive signal to the nonconducting transistor in each pair of series-connected transistors is operative to turn-on the latter transistor.

Referring now to FIG. 2, a power inverting bridge of the type shown in FIG. 1 is provided although, as mentioned earlier, two of the transistors in the bridge have been replaced by the capacitors 42 and 43. Because the transistors have been replaced by the capacitors, the driving circuitry and the feedback control for the bridge is greatly simplified from that shown in FIG. 1. Specifically, in FIG. 2, the feedback network for transistor 31 comprises a secondary coil 80 and a diode 81 which are connected so that the base of transistor 31, when conducting, will be maintained at a voltage below the collector voltage, preventing saturation. Likewise, a secondary coil 82 and a diode 83 are connected between the base and collector of transistor 33 to maintain the base of that transistor, when conducting, at a negative voltage with respect to the collector voltage, to prevent saturation.

Since only two transistors are gated by the squarewave generator 45, the secondary coils on the transformer 47 have a different arrangement than that shown in FIG. 1. Specifically, a secondary coil 84 is provided to drive the base electrode of the transistor 31 with one phase and another secondary coil 85 is connected to drive the base electrode of transistor 33 with an opposite phase square-wave signal permitting only one of the two series-connected transistors 31 and 33 to be conducting at any one time. An anti-crossconduction transformer 86 is also provided with the transformer coils arranged according to the dot convention to ensure that a conducting transistor is substantially turned-off before a nonconducting transistor is turned-on. Thus, by the substitution of two series-connected capacitors for two series-connected transistors in FIG. 1, the circuitry shown in FIG. 2 is made considerably less complicated from that shown in FIG. 1 and cost savings are readily obtainable.

In operation, the circuit in FIG. 2 functions like that in FIG. 1. When transistor 31 has a positive signal applied to its base, it will conduct current. This current will flow from point 35, an inverter output point, through the primary coil 38 to point 36, the other inverter output point. The current will then flow through the alternating current path which comprises capacitor 43 to the negative supply lead 29. After the phase of the signals applied on lines 52 and 53 reverses, transistor 31 will be turned-off and transistor 33 will be turned-on. At this time, current will flow from the positive supply lead 28 through the second alternating current path comprising capacitor 42 to point 36. From point 36 the current flows through the primary coil 38 to the collector of transistor 33. The conducting transistor 33 completes the current path from the positive lead 28 to the negative power supply lead 29.

The feedback circuit for each transistor 31 and 33 operates in the same manner as has been described for the similar feedback circuits in FIG. 1. Likewise, the anti-crossconduction transformer 86 prevents a nonconducting transistor 31 or 33 from turning-on until a conducting transistor 33 or 31 is substantially turned-off.

Referring now to FIG. 3, a schematic diagram of an inverting power supply is shown which includes a diode bridge 90 and a filtering network 91 for producing a DC voltage between points 92 and 93, with the voltage at point 92 being positive with respect to point 93. A variable direct current supply 94 is connected to produce at point 95 a positive voltage with respect to point 93 which is at least as high as the positive voltage at point 92. The voltage between point 95 and 93 is connected across the inverting bridge network 96 which has its two output terminals connected across the primary transformer coil 97. A secondary transformer coil 98 is coupled to the primary transformer coil 97 and has a load 99 connected across its two leads. As the current in the load 99 varies, the circuit losses will also vary so that the voltage across the secondary coil 98 will change somewhat unless some form of voltage regulation is provided.

There are many approaches to voltage regulation. However, the approach adopted in the present invention is a voltage boosting technique. The voltage generated across the secondary coil 98 is applied to a voltage sensing circuit 101 to produce a control signal on the line 102 which varies the magnitude of the variable supply 94. When the current in load 99 increases, the voltage across the secondary coil 98 tends to decrease. The sensing means 101 responds to the decreasing voltage by producing a signal on line 102 which will raise the output voltage of the variable supply 94. As a consequence, the input voltage at point 95 is increased as the load current in load 99 increases. This increased voltage to the input of the bridge circuit 96 operates to increase the current in the primary transformer coil 97 which raises the voltage induced into the secondary coil 98. Thus, the circuit described generally in FIG. 3 is capable of maintaining a constant voltage across an output secondary coil 98. In addition, by controlling the magnitude of the voltage boosting provided by the variable supply 94, the output voltage for the power supply can be maintained at a constant level despite a drop in alternating current voltage at the input to the diode bridge 90. This is highly advantageous for computer power supplies because "brown out" conditions on a power line will not affect the voltage to the computer circuits, ensuring that the computer calculations are error free.

Referring to FIG. 2, and considering the network when the boosting circuit is not operating, the capacitor 24 is charged by current flowing from the inductor 20 through the diode 21 to produce a positive voltage at point 22 with respect to the voltage at point 23. The voltage boosting circuit is connected by a wire 25 to the connection point 150 between the inductor 20 and the diode 21. The anodes of two diodes 151 and 152 are connected to the wire 25. The cathodes of these diodes are each connected to one gated winding of a magnetic amplifier 153. The other ends of the gated windings of the magnetic amplifier connect to opposite ends of a center-tapped secondary coil 154 on transformer 39, the center tap being connected by a wire 27 to the positive supply line 28.

Assuming that appropriate signals are applied on the control wires 26 to the magnetic amplifier 153, the voltage appearing across the capacitor 24 can be raised by the voltage boosting circuit in the following manner. The capacitor 24 will normally be charged from the AC power source through the inductor 20 and the diode 21. When the control signal on wires 26 is properly adjusted, the magnetic amplifier 153 will act like a time control switch and will permit a charging current for capacitor 24 to pass from the point 150 through either diode 151 or 152. Assuming that the magnetic amplifier becomes saturated due to the control signal on wires 26, and that a voltage is induced across the secondary coil 154 with a polarity as shown due to a current flowing in primary coil 38, the voltage at the center tap of the secondary coil 154 will be higher than the voltage at point 150. This higher voltage will cause both diodes 21 and 152 to be reverse biased and diode 151 to be forward biased, thus allowing capacitor 24 to be charged from a current coming out of the center tap of the secondary coil 154. Since the voltage at this center tap is higher than the voltage at point 150, the voltage across the capacitor 24 is raised by the boosting circuit. When a current passes through the primary coil 38 in the opposite direction, the polarity of the voltage induced in the secondary coil 154 will reverse. This causes both diodes 21 and 151 to be reverse biased and diode 152 to be forward biased, thus the voltage at the center tap will again be positive with respect to the voltage at point 150, and capacitor 24 will be charged to a higher voltage as described above. The amount that the voltage is increased is controllable by varying the portion of each cycle of the inverter operating frequency during which the capacitor 24 is charged by current from the secondary coil 154. Maximum voltage boosting will occur when the control signal on wires 26 permits the gated windings of magnetic amplifier 153 to conduct during the entire cycle period and therefore permit capacitor 24 to be continually charged by current passing through coil 154. No voltage boosting occurs when the control signal is such as to prevent the gated windings from conducting during any portion of the cycle period.

To generate the control signals for the boosting circuit, wires 156 and 157 are connected to taps on the output secondary coils 158 and 200. The voltage appearing on the wires 156 and 157 is rectified by the diodes 159 and 160, respectively, to produce a DC voltage across the capacitor 161. This DC voltage also provides the power for the voltage sensing circuit 162. The sensing circuit output on lines 163 has a voltage proportional to the difference between a reference voltage developed at the variable output point on a variable resistor 164 whose fixed resistance leads have a constant voltage applied thereacross from the Zener diode 165, and the voltage across capacitor 161. The output signal on lines 163 is applied to the input of an amplifier 166 which produces the control signal on the control lines 26. By adjusting the setting of the resistor 164, the voltage boosting circuit can be adjusted to produce the desired output voltage in the transformer secondary coils 158 and 200. After the circuit has been adjusted and as loading on the power supply causes the inverter output voltage to decrease, the control signals on control lines 26 will reflect the decrease in output voltage to increase the boosting factor by permitting the gated windings of the magnetic amplifier to conduct for more time permitting the boosting voltage from the secondary coil 154 to be applied to capacitor 24 for a longer period of time, thus raising the DC voltage at the positive supply lead 28.

From the foregoing discussion, it is clear that the voltage boosting circuit is capable of raising the voltage on line 28 to a value above the voltage supplied by the AC power source to point 150. In fact, the voltage at point 28 can be expressed by the following equation:

$$V_0 = V_i \frac{1}{1 - \alpha \frac{t}{T}}$$

where $V_0$ equals the voltage between lines 28 and 29, $V_i$ equals the voltage across capacitor 19, $T$ equals the period of one cycle of the inverter operating frequency, $t$ equals the portion of one cycle of the inverter operating frequency during which the gated windings of the magnetic amplifier are saturated, and $\alpha$ is equal to the turns ratio for each half of the secondary coil 154 to the number of turns in the primary coil 38. The value selected for $\alpha$ is normally selected by considering how much the line voltage at the input to the power supply will be allowed to drop without affecting the normal voltage output. Where the line voltage is permitted to fall to approximately 80 volts without producing a deviation at the output, a value of 0.38 for $\alpha$ can be shown to produce a sufficient voltage boosting to maintain the required voltage across the inverter circuit permitting the output load current and voltage to be unaffected by changes in the voltage at the AC power source.

Referring now to FIG. 1, an improvement to the voltage boosting circuit can be achieved by disconnecting wire 25 from the junction point 150 between the inductor 20 and diode 21, and connecting wire 25 to a tap on the inductor 20. The inductor 20 has $n_1$ turns between the tap and the connection point 150 and $n_2$ turns between the tap and its other end. By a judicious choice of the turns ratio for the sections of inductor 20, it is possible to reduce the alternating current flowing in the capacitor 24, when the boost circuit is in operation.

Assuming that the primary coil 38 has $N_1$ turns and each half of the center-tapped secondary coil 154 has $N_2$ turns, it can be shown by analyzing the circuitry that the current in capacitor 24 can be reduced by selecting the turns for the inductor 20 in accordance with the following equation: $N_2/N_1 = n_1/n_1 + n_2$ By selecting the turns for the inductor 20 in accordance with this equation knowing the predetermined turns ratio for the primary coil 38 and the secondary coil 154, the operation for the voltage boosting circuit is not changed and operates as described for the boosting circuit in FIG. 2. However, by connecting wire 25 to the tap point on the inductor 20, the alternating current through the storage capacitor 24 is significantly reduced from the capacitor currents for the circuit in FIG. 2 when the boosting circuit is operative. Since the storage capacitor 24 is preferably of the electrolytic type, it is advantageous to reduce the alternating currents in this capacitor because the operating life of such capacitors can be increased by reducing alternating currents passing therethrough.

The power transformer in FIG. 1 has additional tapped secondary windings 200 and 158 coupled to the primary coil 38 for producing a square-wave output signal at the frequency of the square-wave control signals produced by the square-wave generator 45. These square-wave output signals are applied to filtering and regulating networks to produce at the output terminals 202 and 203 a highly regulated direct current voltage.

By way of example, the tap 204 on secondary coil 200 and the tap 205 on secondary coil 158 are series-connected through a current transformer 206 to the gated windings of a magnetic amplifier 207. The gated winding outputs are connected to diodes 208 and 209 which provide full wave rectification for the magnetic amplifier 207 output. A series-connected inductor 210 and an output filter capacitor 211 complete the filtering and regulating network for the positive voltage at output terminal 202. The control signals applied to the control winding at points $Y_1$ and $Y_2$ are generated by a voltage-sensing network and amplifier similar to the voltage-sensing network and amplifier which control the magnetic amplifier 153 used in the boost circuit. While a magnetic amplifier regulator is shown, it is equally clear that other kinds of output voltage regulation, such as Zener diode regulators and the like, can be employed to provide output regulation.

While the foregoing discussion has been made with a particular emphasis upon preferred embodiments of the present invention, certain modifications in form may be made without departing from the spirit and scope of this invention. For example, the feedback means for controlling the base drive current of each transistor in the power inverter may be somewhat modified from that shown in FIG. 1. For example, only three secondary transformer coils are shown with one such coil being a center-tapped coil. For ease of construction, it may prove to be easier to make four secondary coils and replace the center-tapped coils by two of these secondary coils. In addition, it may be possible to produce the feedback network to prevent saturation of the inverter transistors by circuitry other than that which is shown. In addition, modifications to the gating circuitry for the transistors in the power inverter are readily apparent. For example, the anti-crossconduction transformers may be replaced by some more elaborate gating network which would permit the turning on of a transistor only when the other transistor in the series-connected pair of transistors is turned-off. Such networks will make the inverter more complex as well as more costly. However, such modifications are envisioned by the present invention, although the anti-crossconduction transformers are preferred for economic reasons. Additionally, the voltage-sensing network and amplifier which control the magnetic amplifier in the voltage boosting circuit may be replaced by other circuits which will produce a signal on the magnetic amplifier control winding that is operative to adjust the time when the gated windings will conduct.

These modifications and other changes readily apparent to those of skill in the art may be made without departing from the spirit and scope of the present invention as defined by the following claims.

What is claimed is:

1. A power inverting circuit for converting direct current into an alternating current output comprising in combination:

a source of direct current power having two power output terminals;

a first and a second current gate element, each gate element having a control electrode and a first and a second controlled electrode, signals applied to the control electrode being operative to control the current passing between said controlled electrodes of the gate elements, the first controlled electrode of said first gate is series-connected to the second controlled electrode of said second gate element to form one inverter output point, the second controlled electrode of said first gate element is connected to one said power output terminal and said first controlled electrode of said second gate element is connected to said other power output terminal;

an alternating current path from one said power output terminal and another alternating current path from said other power output terminal to a common point, said common point forming a second inverter output point, said second inverter output point being direct current isolated from both said power output terminals;

a power transformer means with a primary coil and a secondary output coil, the opposite ends of said primary coil being connected to said first and second inverter output points and said secondary coil providing an alternating current output;

control signal generating means connected to each said control electrode, said control signal generating means producing a square-wave signal operative to cause one gate element at a time to conduct current through its controlled electrodes and operative to alternate which gate element is conducting; and control means responsive to current flow in said control electrode, of one said gate element to prevent the other said gate element from conducting while said one gate element is changing from a conducting to a non-conducting state.

2. The power inverting circuit in claim 1 wherein said alternating current path and said other alternating current path comprise a second pair of series-connected current gate elements, each gate element having a control electrode and a first and second controlled electrode being operative to control the current passing through said controlled electrodes, the first controlled electrode of one gate element of said second pair of series-connected current gate elements is connected to the second controlled electrode of the other gate element of said second pair of series-connected gate elements to form said second inverter output point, the second controlled electrode of said one gate element being connected to one said power output terminal and said first electrode of said other gate element is connected to said other power output terminal forming two pairs of series-connected current gate elements connected between said positive and said negative terminals and additionally comprising:

a direct current blocking capacitor connected between one said inverter output point and one said end of said primary coil to provide a direct current isolation between both said inverter output points.

3. The power inverting circuit of claim 1 additionally including:

feedback means coupled to said power transformer primary coil and connected between one controlled electrode of each gate element and said control electrode of the same gate element, each said feedback means being operative to prevent said control signal generating means from overdriving each gate element.

4. The power inverting circuit of claim 1 wherein said control means comprise an anti-crossconduction transformer having two transformer coils, one said anti-crossconduction transformer coil being connected in series between said control signal generating means and the control electrode of said one gate element and said other anti-crossconduction transformer coil being connected in series between said control signal generating means and said control electrode of said other gate element, said anti-crossconduction transformer being operative to prevent one gate element from switching from its non-conducting to its conducting state so long as current flows in the control electrode of the other gate element as said other gate element switches from its conducting to its nonconducting state.

5. The power inverting circuit of claim 3 wherein each said feedback means includes:

a secondary output coil coupled to said power transformer primary coil, one end of said secondary coil being connected to the controlled electrode of one said gate element;

a diode element having one electrode connected to the other end of said secondary coil and its second electrode connected to the control electrode of said gate element, forming a feedback path from the controlled electrode to the control electrode of each said gate element, said feedback path generating signals operative to prevent each gate element, while conducting, from operating in a saturation mode.

6. A power inverting circuit for converting direct current into an alternating current output signal comprising, in combination:

a source of direct current power having two power output terminals;

a first and a second transistor element of the same conductivity type, each transistor having a base electrode, a collector electrode and an emitter electrode, the collector of said first transistor is connected to the emitter of said second transistor to form a pair of series-connected transistors, said connection forming a first inverter output point, the emitter of said first transistor is connected to one of said power output terminals and the collector of said second transistor is connected to said other power output terminal;

an alternating current path from one said power output terminal and a second alternating current path from said other power output terminal to a common point, said common point forming a second inverter output point;

a power transformer means with a primary coil and a secondary output coil, the opposite ends of said primary coil being connected to said first and second inverter output points and said secondary coil providing the inverting circuit output;

control signal generating means producing two square-wave control signals of opposite phase, the first square-wave control signal being connected to the base electrode of said first transistor to alternately cause said first transistor to conduct and to prevent current flow therethrough, the second square-wave control signal being connected to the base electrode of said second transistor to alternately cause said second transistor to prevent conduction and to conduct current therethrough; and control means connected to the base of each said transistor, said control means being responsive to current flow in the base of one said transistor to prevent the other said transistor from conducting while said one transistor is switching from a conducting to a nonconducting state.

7. The inverting circuit in claim 6 wherein said control means includes a feedback biasing network comprising:

a secondary feedback coil for each said transistor, each said feedback coil being coupled to said primary coil to produce a signal when a transistor is conducting, one end of each said feedback coil being connected at one end to the collector electrode of one said transistor; and a diode for each said transistor connected between the base and the other end of each said feedback coil to provide a voltage feedback signal for each transistor from its collector to its base, said feedback signal having a polarity to bias the base of a conducting transistor to prevent saturation of a conducting transistor by preventing base overdrive.

8. The inverting circuit in claim 6 wherein said control means comprises:
anti-crossconduction transformer means with two transformer-coupled coils, each transformer coil being connected in series between said control signal generating means and one said base electrode, the coupling between said two transformer coils being operative to prevent a control signal from being applied to the base of one said transistor when current is flowing in the base of the other transistor, preventing a non-conducting transistor from conducting before a conducting transistor becomes non-conducting.

9. Inverting circuit in claim 6 wherein said first and second alternating paths comprise a third and a fourth transistor means, each transistor means having a base electrode, an emitter electrode and a collector electrode, the emitter electrode of said third transistor means being connected to the collector electrode of the said fourth transistor means, said connection forming said second inverter output point, said collector of said third transistor means being connected to one power output terminal and said emitter of said fourth transistor means being connected to the other power output terminal, said third and fourth transistors comprising a second pair of series-connected transistors, the base electrode of each transistor in said second pair of series-connected transistors being connected to one square-wave signal from said control signal generating means, said generating means operative to alternately cause one transistor in said second pair of series-connected transistors to conduct, the inverting circuit additionally comprising a direct current blocking capacitor series-connected between said primary coil and one said output point.

10. The power inverting circuit in claim 6 wherein said control means includes:
feedback means coupled to such primary coil and connected between each said collector electrode of each said transistor and the base electrode of the same transistor, each said feedback means operative to prevent said square-wave control signals from saturating a conducting transistor.

11. The inverting circuit in claim 8 additionally including:
anti-crossconduction transformer means with two transformer-coupled coils, each transformer coil being connected in series between said control signal generating means and one said base electrode, the coupling between said two transformer coils being operative to prevent a control signal from being applied to the base of one said transistor when current is flowing in the base of the other transistor, preventing a non-conducting transistor from conducting before a conducting transistor becomes non-conducting.

12. Inverting circuit in claim 11 wherein said first and second alterning paths comprise a third and a fourth transistor means, each transistor means having a base electrode, an emitter electrode and a collector electrode, the emitter electrode of said third transistor means being connected to the collector electrode of said fourth transistor means, said connection forming said second inverter output point, said collector of said third transistor means being connected to one power output terminal and said emitter of said fourth transistor means being connected to the other power output terminal, said third and fourth transistor comprising a second pair of series-connected transistors, the base electrode of each transistor in said second pair of series-connected transistors being connected to one square-wave signal from said control signal generating means, said generating means operative to alternately cause one transistor in said second pair of series-connected transistors to conduct, the inverting circuit additionally comprising a direct current blocking capacitor series-connected between said primary coil and one said output point.

13. A power inverting circuit for converting direct current into an alternating current output comprising, in combination:
a source of direct current power having two power output terminals;
a first and a second gate element, each gate element having a control electrode and a first and a second controlled electrode, signals applied to the control electrode being operative to control the current passing between said controlled electrodes of the gate elements, the first controlled electrode of said first gate is series-connected to said second controlled electrode of said second gate element to form one inverter output point, the second controlled electrode of said first gate element is connected to one said power output terminal and said first controlled electrode of said second gate is connected to said other power output terminal;
an alternating current path from one said power output terminal and another alternating current path from said other power output terminal to a common point, said common point forming a second inverter output point, said second iverter output point being direct current isolated from both said power output terminals;
a power transformer means with a primary coil and a secondary output coil, the opposite ends of said primary coil being connected to said first and second inverter output points and said secondary coil providing an alternating current output;
control signal generating means connected to each said control electrode, said control signal generating means producing a square-wave signal operative to cause one gate element at a time to conduct current through its controlled electrodes and operative to alternate which gate element is conducting;

control means responsive to current flow in said control electrode of one said gate element to prevent the other said gate element from conducting while said one gate element is changing from a conducting to a non-conducting state;
feedback means coupled to said power transformer primary coil and connected between one controlled electrode of each gate element and said control electrode of the same gate element, each said feedback means being operative to prevent said control signal generating means from overdriving each gate element.

14. A power inverting circuit for converting direct current into an alternating current output signal comprising in combination:

a source of direct current power having two power output terminals;

a first and a second transistor element of the same conductivity type, each transistor having a base electrode, a collector electrode and an emitter electrode, the collector of said first transistor is connected to the emitter of said second transistor to form a pair of series-connected transistors, said connection forming a first inverter output point, the emitter of said first transistor is connected to one of said power output terminals and the collector of said second transistor is connected to said other power output terminal;

an alternating current path from one said power output terminal and a second alternating current path from said other power output terminal to a common point, said common point forming a second inverter output point;

a power transformer means with a primary coil and a secondary output coil, the opposite ends of said primary coil being connected to said first and second inverter output points and said secondary coil provides an alternating current output signal;

control signal generating means producing two square-wave control signals of opposite phase, the first square-wave control signal being connected to the base electrode of said first transistor to alternately cause said first transistor to conduct and to prevent current flow therethrough, said second square-wave control signal being connected to the base electrode of said second transistor to alternately cause said second transistor to prevent conduction and to conduct current therethrough;

control means connected to the base of each said transistor, said control means being responsive to current flow in the base of one said transistor to prevent the other said transistor from conducting while said one transistor is switching from a conducting to a non-conducting state;

a secondary feedback coil for each said transistor each said feedback coil being coupled to said primary coil to produce a signal when a transistor is conducting, one end of each said feedback coil being connected to the collector electrode of one said transistor;

a diode for each said transistor connected between the base and the other end of each said feedback coil to provide a voltage feedback signal for each transistor from its collector to its base, said feedback signal having a polarity to bias the base of a conducting transistor to prevent saturation of a conducting transistor by preventing base overdrive.

* * * * *